United States Patent [19]

Granitz

[11] Patent Number: 4,730,710
[45] Date of Patent: Mar. 15, 1988

[54] CLUTCH-BRAKE ASSEMBLY

[75] Inventor: Robert J. Granitz, Roseau, Minn.

[73] Assignee: Polaris Industries, Inc., Roseau, Minn.

[21] Appl. No.: 939,268

[22] Filed: Dec. 10, 1986

Related U.S. Application Data

[63] Continuation of Ser. No. 540,767, Oct. 11, 1983, abandoned.

[51] Int. Cl.⁴ .................. F16D 67/02; A01D 69/08
[52] U.S. Cl. .......................... 192/18 R; 192/93 A; 56/11.3
[58] Field of Search ............... 192/14, 15, 16, 18 R, 192/93 A, 107 C; 56/11.3

[56] References Cited

U.S. PATENT DOCUMENTS

| | | | |
|---|---|---|---|
| 1,451,818 | 4/1923 | Forster | 74/572 |
| 1,975,961 | 10/1934 | Lindeman | 192/93 A |
| 2,105,218 | 1/1938 | Kirby | 192/93 A |
| 4,141,439 | 2/1979 | Lunde et al. | 192/18 R |
| 4,205,509 | 6/1980 | Miyazawa et al. | 192/18 R X |
| 4,213,521 | 7/1980 | Modersohn | 192/18 R |
| 4,286,701 | 9/1981 | MacDonald | 192/18 R |
| 4,306,405 | 12/1981 | Fleigle | 192/18 R X |
| 4,310,083 | 1/1982 | Maucher | 192/18 R |
| 4,313,293 | 2/1982 | Nagai | 192/18 R |
| 4,330,054 | 5/1982 | MacDonald | 192/18 R X |
| 4,333,303 | 6/1982 | Plamper | 192/18 R X |
| 4,352,266 | 10/1982 | Lloyd et al. | 192/18 R X |
| 4,362,004 | 12/1982 | Rush, Jr. et al. | 192/18 R X |
| 4,372,433 | 2/1983 | Mitchell et al. | 192/18 R |
| 4,377,224 | 3/1983 | Takata et al. | 192/18 R |

FOREIGN PATENT DOCUMENTS

0146745 9/1983 Japan .................... 74/574

Primary Examiner—Rodney H. Bonck
Assistant Examiner—Richard M. Lorence
Attorney, Agent, or Firm—Gregory P. Kaihoi; James R. Haller

[57] ABSTRACT

A clutch-brake assembly for use on a power-driven implement such as lawnmower having a stationary frame and a power-driven shaft. A driven member is rotatably attached to the shaft and carries a brake pad and a clutch pad on a spring permitting axial movement of the pads. A unique flywheel is attached to the shaft, and one of its surfaces serves as a clutch plate, normally engaging the clutch pad so that the driven member rotates with the shaft. A brake plate is mounted coaxially with the shaft and in alignment with the brake pad so that when the brake plate is rotated it is displaced axially towards the brake pad. When the brake plate engages the brake pad, the spring is compressed, disengaging the clutch plate and clutch pad. The flywheel desirably comprises a central shaft mount, an annular shell, a web connecting the shell and mount, and a weight received in the shell.

19 Claims, 20 Drawing Figures

CLUTCH-BRAKE ASSEMBLY

This application is a continuation of application Ser. No. 540,767, filed Oct. 11, 1983, now abandoned.

TECHNICAL FIELD

This invention relates to a clutch-brake assembly for use on lawnmowers, engines, and other power driven mechanisms.

BACKGROUND ART

Accidents often are caused by motor-powered machinery or implements such as lawnmowers, snowblowers, etc. In an effort to alleviate the dangers associated with operating such implements, manufacturers often have equipped them with deadman switches which automatically shut the engine off and/or brake a rotary driven element to a stop should the operator, for instance, let go of the handle. The deadman switch assures that if the operator trips and falls, or leaves the implement unattended, the engine immediately stops, reducing the danger of injury. Although noble in theory, such deadman switches can become impractical in operation because each time the operator must let go of the handle, e.g., to pick up debris from a lawn, the engine must be restarted. This often leads to consumer frustration and, occasionally, to attempts to circumvent the safety device.

To alleviate this drawback, some manufacturers have utilized a clutch-brake assembly which allows the functional or rotary part of the implement, e.g.; a lawnmower blade, to be disengaged from the engine by means of a clutch before such part is braked to a stop. With this design, the engine continues to run while the implement is unattended, but the dangerous part is incapacitated by the clutch-brake mechanism.

Such clutch-brake assemblies provide safety without undue inconvenience to the operator, but present new problems. Most clutch-brake assemblies are expensive to manufacture for a number of reasons Such assemblies commonly are manufactured to very close tolerances. Frequently the assembly must be sealed to prevent fouling from grass clippings or other foreign matter, particularly when such exacting tolerances are involved. Because of design limitations, such assemblies usually include a great many parts which often must be laboriously assembled part-by-part onto the implement housing.

Motorized implements which might utilize a clutch-brake assembly generally also incorporate flywheels. Most flywheels, however, are either expensive to manufacture or are unduly heavy. For example, flywheels can be manufactured relatively cheaply by simply forming a round metal disc in a stamping operation and then welding several of the discs together to form a heavy flywheel. A significant portion of the mass of such flywheels is carried near the central axis where little angular momentum is generated, thus causing the flywheel to be unduly weighty in relation to the angular momentum attainable. To reduce weight, flywheels have been machined from discs to remove much of the flywheel thickness near the central portion while leaving a greater mass at the periphery. Such a configuration maximizes the effectiveness of the flywheel while minimizing its total weight. Unfortunately, this manufacturing process is also rather expensive.

DISCLOSURE OF THE INVENTION

The invention in one embodiment involves a new and unique clutch-brake assembly for use on a power-driven implement having a stationary frame and a drive. The assembly includes a clutch plate attached to the shaft and rotatable therewith, a brake plate which is carried coaxially of the shaft, and a driven member such as a lawnmower blade carried by the shaft and freely rotatable thereon. The assembly also includes a brake pad and a clutch pad for engagement with the brake plate and clutch plate, respectively, and spring means carried by the driven member and spaced radially from the shaft axis, the spring means carrying the brake and clutch pads in alignment with the brake and clutch plates, respectively, and normally biasing the clutch pad into engagement with the clutch plate to drive the driven member. The brake plate is attached to the frame coaxially of the shaft by motion transmitting attachment means which causes axial movement of the brake plate in response to rotation thereof between a first axial position out of engagement with the brake pad and a second axial position in braking contact with the brake pad and spacing the clutch pad from the clutch plate, thereby stopping the rotation of the blade while allowing the shaft to continue to rotate.

In a preferred embodiment, the clutch-brake assembly is utilized on a lawnmower to disengage the blade when the operator lets go of the deadman switch, typically carried on the handle of a lawnmower. In this embodiment, the clutch plate is defined by a surface of a flywheel attached to the shaft and rotatable therewith. The motion transmitting attachment means for attaching the brake plate to the frame includes a ring-shaped ramp mounted coaxially of the shaft, the ramp having inclined camming slots about its periphery. An actuator hub carries the brake plate and has inclined tabs defining cam followers which ride in the slots of the ramp. Means is provided to rotate the actuator hub, and as it rotates the inclined slots cause the hub to move axially toward the brake pad, thereby engaging the brake plate with the brake pad and disengaging the clutch pad from the clutch plate.

Preferably, the parts of the clutch-brake assembly are mounted to a clutch-plate hub to form a sub-assembly comprising a clutch plate hub, the clutch plate (desirably a fly wheel), the ramp rotatably mounted to the clutch plate hub, the actuator hub carried by the ramp, the brake plate carried by the actuator hub, the driven member rotatably carried by the clutch plate hub, and the spring means carried by the driven member and bearing the clutch and brake pads. The clutch plate hub is rigidly but removably attachable to the drive shaft, allowing this sub-assembly to be preassembled and installed on the lawnmower as a unit.

As noted above, a preferred embodiment of the clutch-brake assembly incorporates the use of a flywheel. A preferred flywheel is comprised of a central shaft engaging means, an annular shell defining an annular cavity for receiving a flywheel weight, connector means for coaxially mounting the annular shell to the shaft engaging means, and a flywheel weight positioned coaxially within the annular cavity. One such preferred flywheel includes an upper shell and a lower shell, each of which is formed into complementary configurations so that when joined the two shells form a circular housing having a thin, web-like central portion and an outer annular cavity for receiving the flywheel weight.

Flywheels of the described configuration provide substantial angular momentum at minimal total mass, and are easily and inexpensively manufactured.

BEST MODE FOR CARRYING OUT THE INVENTION

It should be initially understood that this clutch-brake assembly can be used on any implement for which it is desirable to quickly stop rotation of functional parts of the implement while maintaining operation of the motor or driving element. Because a lawnmower is a preferred application of the invention, the following explanation is provided in that context.

Figure 1:
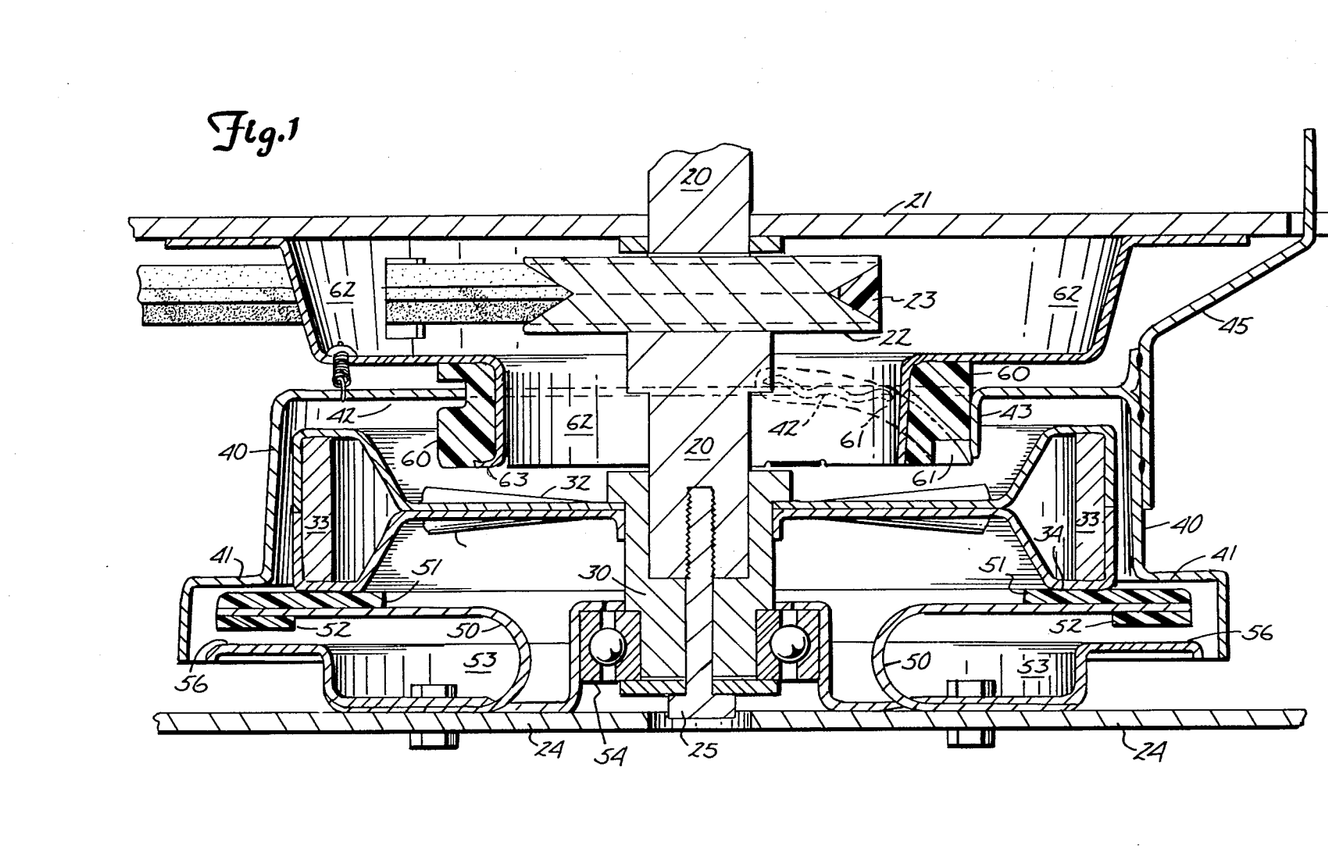
FIG. 1 is a partial cross-sectional elevational view of a lawnmower incorporating the invention.

FIG. 1 depicts a partial cross-sectional view of a lawnmower equipped with the clutch-brake assembly of the invention. An engine, not shown, is attached to a lawnmower housing (21) through which the drive shaft (20) extends. An optional pulley (22) and V-belt (23) may be attached to the shaft, e.g., to drive a self-propelled mechanism of the lawnmower. The lawnmower blade (24) is attached by bolts to a spring mounting hub (53) which in turn is affixed to the outer portion of a ballbearing race (54), the inner portion of which is attached to a clutch plate hub (30). The hub (30) is rigidly secured to the shaft (20) by bolt (25). Thus, the blade (24) is attached to the shaft (20) but is freely rotatable with respect to the shaft.

Also attached to the clutch plate hub (30) and encircling it is a flywheel generally designated as (31). The flywheel, which will be discussed in greater detail below, is preferably constructed, as shown in FIG. 1, of two opposing plates of sheet metal or similar material which have been formed to the desired shape. The central portion of the flywheel is web-like and may have radially extending ribs (32) to add strength and rigidity to the web-like portion. The outer portion of the flywheel is comprised of an annular cavity in which is placed a flywheel weight (33). The unique configuration of this flywheel makes it relatively inexpensive to manufacture.

Also attached to the blade (24) and the spring mounting hub (53) are one or more, preferably two, generally U-shaped leaf springs (50) each carrying a clutch-brake pad (51) on its upper surface. Although two separate pads can be utilized for clutching and braking, respectively, these can easily be combined into a single clutch-brake pad. As depicted in FIG. 1, the leaf springs (50) normally bias the clutch pad portion of the clutch-brake pads (51) into contact with the lower surface of the flywheel annular chamber. In this manner, this surface serves as a clutch plate (34). As will now be understood, when the clutch plate (34) is engaged with the clutch-brake pads (51), the lawnmower blade is mechanically linked to the drive shaft (20) and will rotate so as to cut grass.

Attached to the underside of the lawnmower housing (21) is a generally dish-shaped bracket carrying a circular ramp mounting hub (62) coaxially of the shaft (20). A ring-shaped ramp (60) is secured to the ramp-mounting hub (62) by a plurality of rampmounting tabs (63), preferably three in number, located equidistantly about the periphery of the bottom of the hub (62). The ramp, as will be discussed in greater detail below, is equipped with a plurality of inclined slots (61) in its outer peripheral surface. In each of these slots (61) rides a tab (42) of an actuator hub designated generally as (40), the latter being generally dish-shaped and having walls extending downwardly about the flywheel (31). The actuator hub (40) includes positioning means for locating the hub (40) coaxially of the shaft (20); preferably the positioning means comprises a generally annular flange in slideable contact with the ramp (60). The actuator hub is free to rotate within limits, and therefore will be cammed axially as the tabs (42) rotate within the inclined slots (61). As can be seen in FIG. 1, if the actuator hub (40) is rotated clockwise (viewed from the top), the tabs (42) riding in the slots (61) will cause the actuator hub (40) to move axially downwardly. The ramp (60) further serves as a bushing for the actuator hub flange (43) to center the actuator hub (40) and brake plate (41) about the drive-shaft.

Along the lower portion of the actuator hub (40) is located a shoulder defining a brake plate (41), the underside of which provides an annular braking surface facing and vertically aligned with the clutch-brake pads (51). As the actuator hub (40) is cammed downwardly, the brake plate (41) engages the clutch-brake pads (51). As these two surfaces engage one another, the brake pads will begin to inhibit rotation of the blade (24). Simultaneously, the brake plate (41) exerts a downwardly directed force on the clutch-brake pads (51). The leaf springs (50) hence are compressed, disengaging the clutch-brake pads (51) from the clutch plate surface (34) of the flywheel (31) and removing the driving force from the blade. Thus, the blade (24) is simultaneously disengaged from the driving force and braked to a halt by the actuator hub (40). Notice that the configurations of the various elements and their operation allow tolerances to be quite large—e.g., the vertical travel of the brake plate may be, and desirably is, approximately three-sixteenths of an inch (about 0.5 cm.) or greater, compared to traditional mechanisms in which such travel is comparatively very small.

The clutch-brake assembly of FIG. 1 is equipped with a deadman mechanism. One or more actuator springs (44) may be attached from the ramp-mounting hub (62) to the actuator hub (40) so that they urge the actuator hub to rotate in a clockwise direction (viewed from the top), thus urging the brake plate (41) to engage the clutch-brake pad (51) to stop rotation of the blade (24). An actuator arm (45) or similar mechanism such as a cable is attached to the actuator hub (40) and passes upwardly through the lawnmower deck (21) to a conventional cable-linked deadman mechanism located on the handle of the lawnmower (not shown). The operator, by operating this mechanism, may rotate the actuator hub against the force of the springs (44) to thus disengage the brake plate (41) and thereby engage the clutch, allowing the blade to rotate.

Figures 10, 11:
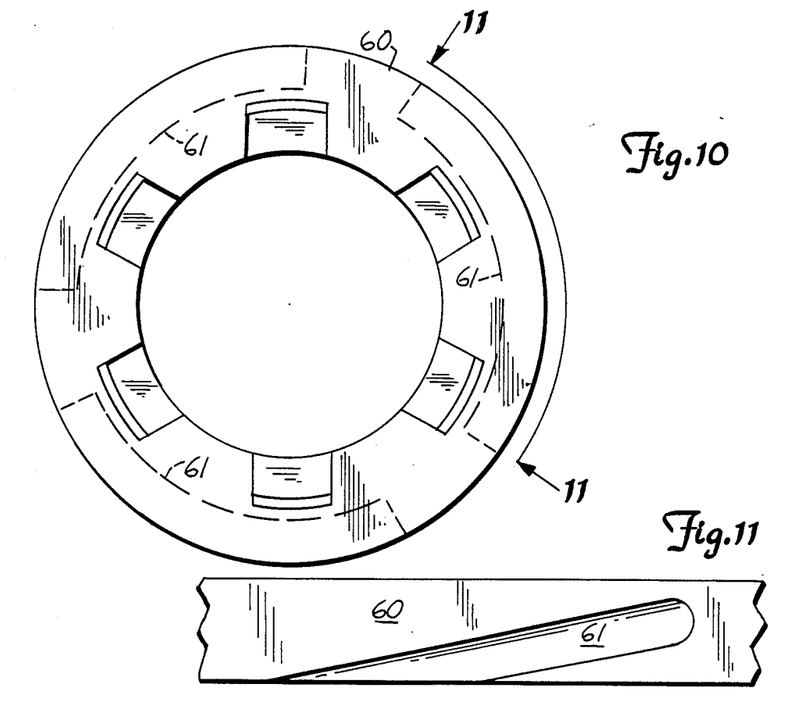
FIG. 10 is a bottom view of a ramp in which the tabs of an actuator hub ride.
FIG. 11 is a broken-away side view of the ramp of FIG. 10 taken along line 11—11 thereof.

The ramp (60) is shown in enlarged detail in FIGS. 10 and 11. FIG. 10 is a bottom view of the ramp depicting its disc shape. Adjacent the inner circumference of the disc and on the bottom side of the ramp are located a plurality of shallow recesses formed to receive the ramp-mounting tabs (63). FIG. 10 depicts a ramp with six such recesses; FIG. 1 depicts a ramp (60) and ramp-mounting hub (62) with three such recesses and corresponding mounting tabs (63) (only two of which are visible in the drawing). The inclined slots (61) of the ramp are shown in phantom lines in FIG. 10. FIG. 11 shows approximately the angle of the incline. The ramp may be manufactured from any material which will resist the wear of the actuator hub tabs (42) riding in the slots. Preferably the ramp is manufactured from polyethylene or a similar material.

Figures 12, 13, 14, 15:
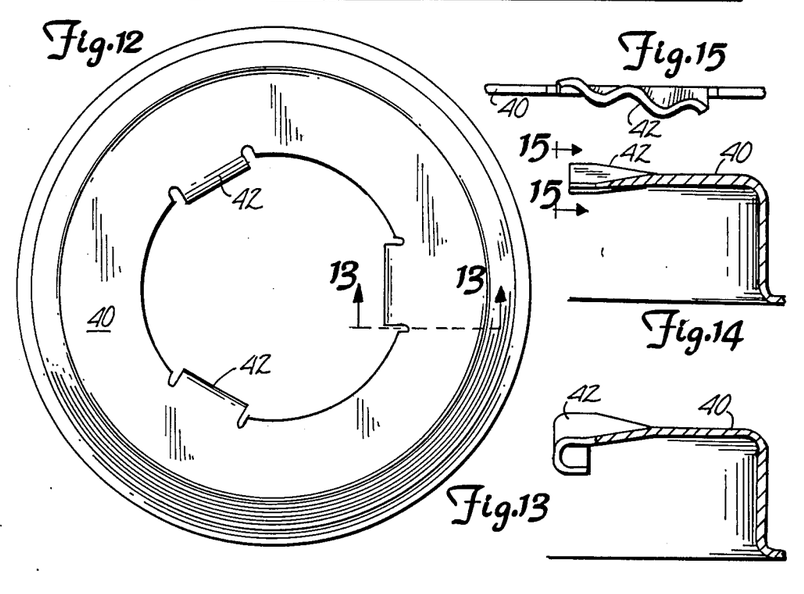
FIG. 12 is a top view of an actuator hub.
FIG. 13 is a broken-away cross-sectional view of the hub of FIG. 12 taken along line 13—13 thereof.
FIG. 14 is a broken-away cross-sectional view similar to that of FIG. 13 but showing a modification thereof.
FIG. 15 is an end view of the tab of FIG. 14.

FIG. 12 is a top view of the actuator hub (40). The hub has two or more, preferably three, radially inwardly extending tabs (42) which ride in the respective inclined ramp slots (61). FIG. 13 provides a partial cross-sectional view of one such tab which is generally U-shaped and is inclined along its length to correspond to the incline of the ramp slot. FIG. 14 depicts another tab configuration, an end view of which is depicted in FIG. 15 to show the sinuous wave form of this tab. The sinuous form terminates at its leading and trailing edges so that the edges of the tab do not contact the ramp slot, thereby reducing wear of the ramp. This is particularly desirable because, as can be seen upon examination of FIG. 1, when the brake plate (41) engages the clutch-brake pad (51), the angular momentum of the blade (24) is transmitted to and absorbed by the lawnmower housing (21) through the interface between the actuator hub tab (42) and the ramp slot (61).

Referring again to FIG. 1, a preferred direction of incline of the ramp slot enhances the functioning of the clutch-brake mechanism. Viewed from the top, the lawnmower blade (24) rotates in the clockwise direction, which is also the direction the actuator hub (40) of FIG. 1 will turn as it descends towards the clutch-brake pad (51). As the brake plate (41) comes into frictional contact with the clutch-brake pad (51), the pad will urge the plate, and hence the actuator hub (40) in the clockwise direction, further increasing the pressure of the brake plate (41) on the clutch-brake pad (51). The cooperation of these elements causes self-energizing engagement of the brake utilizing rotational momentum of the blade and thereby commensurately reduces the required force from the actuator spring(s) (44) to actuate the clutch-brake mechanism. Note also that even if the actuator springs (44) and the deadman assembly should break or be disconnected, the weight of the actuator hub (40) and the vibration of the engine tend to permit the actuator hub to move downwardly under gravity until the brake plate (41) comes into contact with the clutch-brake pad (51). Upon contact, the self-energizing feature would tend to brake the blade to a stop or kill the engine.

Figure 2:
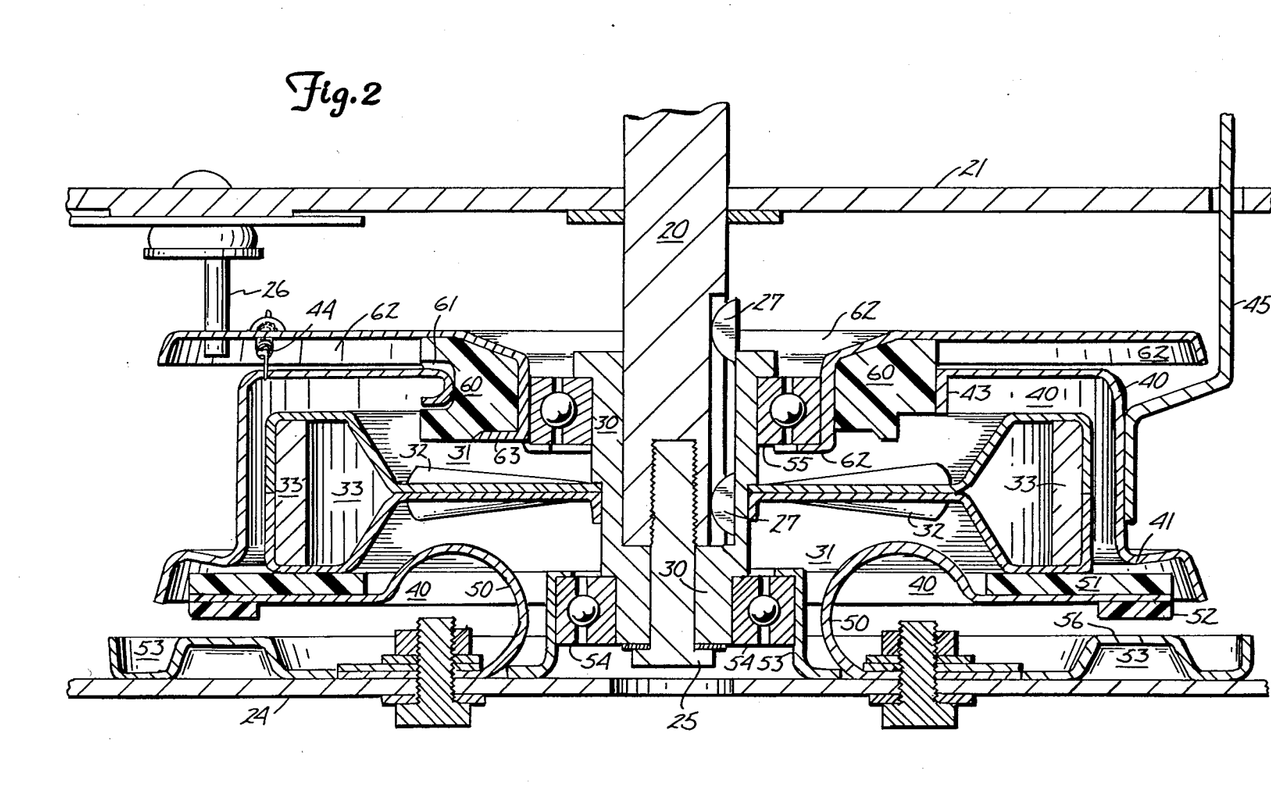
FIG. 2 is similar to FIG. 1 but shows a modified embodiment.
Figures 3, 4, 5:
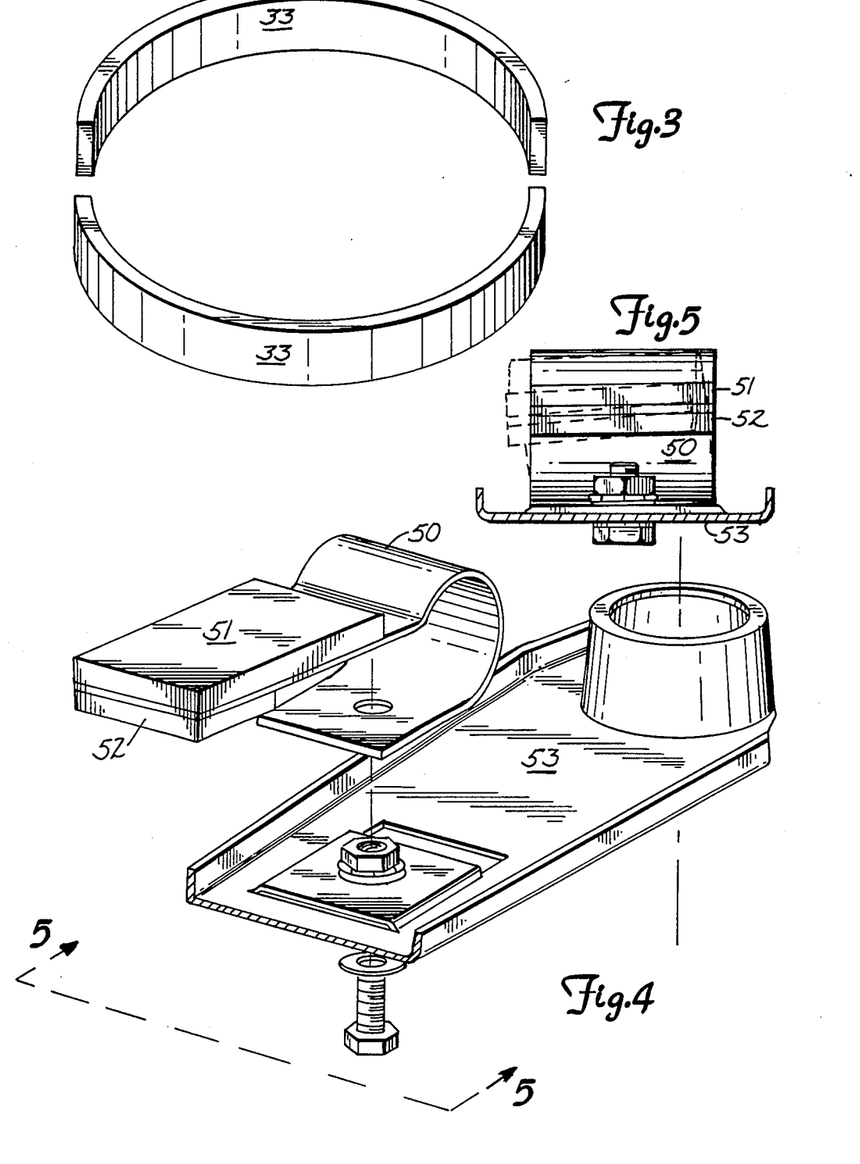
FIG. 3 is a perspective, exploded view of a preferred flywheel weight which includes two semi-circular rings.
FIG. 4 is a broken-away, exploded perspective view of preferred means for mounting the brake and clutch pads.
FIG. 5 is a cross-sectional view taken along line 5—5 of FIG. 4.

FIG. 4 depicts a preferred embodiment of the leaf spring (50), which spring is also shown in FIG. 2. In comparison to the semi-circular curve of the spring depicted in FIG. 1, this preferred spring is curved into approximately a three-quarter circle. This configuration causes the clutch-brake pad (51) and a spring stop pad (52) mounted beneath the spring to move generally in a more perfect vertical direction as the spring (50) is compressed, resulting in a more uniform contact of the clutch and brake pads with the respective surfaces of the clutch and brake plates.

FIG. 4 also depicts a preferred method of attaching the spring (50) to the spring-mounting hub (53). The lower arm of the generally U-shaped spring (50) is inserted into the slot in the hub (53), a bolt is inserted through the spring and the hub, and secured by a nut on the top side of the hub. This method of joining the two pieces provides great stability against rotational forces applied to the clutch-brake pad while utilizing but a single bolt. This same bolt can be used to secure the cutting blade (24) to the spring-mounting hub (53). It should also be noted that the spring-mounting hub (53) depicted in FIG. 1 is generally disc-shaped, while the springmounting hub (53) in FIG. 4 is more rectangular in configuration and is desirably elongated in the direction of the blade. The preferred hub depicted in FIG. 4 is also shown in FIG. 2.

FIG. 5 depicts the torsional resiliency of the flex spring (50) in response to rotational force applied to the clutch-brake pad (51). The engagement of the clutch plate (34) with the clutch-brake pad (51) is relatively gentle. As the pad begins to contact the plate, there is initial slippage therebetween; the pad gradually picks up rotational speed until slippage ceases and the pad rotates in firm contact with the plate. In contrast, when the brake plate (41) engages the clutch-brake pad (51), although initially the mating is gentle and slippage occurs as described above, rotation of the clutch-brake pad (51) causes rotation of the brake plate (41), rapidly urging the brake plate (41) downwardly into firmer contact with the brake pad and aggressively halting rotation of the blade (24). During this aggressive "lockup", substantial angular momentum is absorbed by the spring (50). The torsional resiliency of the flex spring (50) allows the spring to deflect as illustrated in exaggerated form in FIG. 5, thereby dampening the shock to the assembly when the blade is so quickly stopped and also reducing the noise accompanying such shock.

In like manner, when the clutch-brake pad (51) comes into engagement with the clutch plate (34), although the engagement is gentle in comparison to the braking engagement, it is nevertheless quickly accomplished and the torsional resiliency of the spring likewise mitigates the shock which is absorbed by the shaft (20) and the connected parts. This mating is also further tempered by the fact that, as illustrated in FIG. 5, the pads (51) and (52) are desirably deflected away from the horizontal, momentarily reducing the surface area of the pad in contact with the clutch plate (34) and thereby promoting slippage briefly to reduce the shock transmitted to the shaft (20).

This feature is particularly advantageous for reducing the potential harm to the lawnmower when, for example, the blade strikes a rock, tree stump, or other rigid obstruction. The shock to the drive shaft and engine is tempered by the torsional resilience of the leaf spring (50), and particularly by the momentary deflection of the clutch-brake pads from horizontal which promotes momentary slippage.

Each leaf spring (50) also carries a spring stop pad (52), as noted above. This pad limits the distance the spring (50) may be compressed, thereby limiting the axial movement of the actuator hub (40), and preventing the actuator hub tabs (42) from escaping from the ramp slots (61). The spring stop pad (52) also, by virtue of its stop function, participates in the "locking-up" of the braking function described above. In so doing, the pad assists in reducing the noise generated by the aggressive lockup. Further, by engaging with the stop plate (56) which is a part of the spring mounting hub (53), the spring stop pad rigidifies the spring; that is, the angular momentum of the blade is transmitted directly from the stop plate (56) to the spring stop pad (52), rather than traveling through the curved portion of the flex spring (50). This promotes quicker braking and reduces strain on the flex spring (50).

As noted above, and as can be seen in FIG. 1, the allowable tolerances of the clutch-brake assembly are quite large. The total vertical travel of the brake plate (41) may be, and preferably is, three-sixteenths of an inch (about 0.5 cm.) or greater. This is in comparison to very close tolerances of conventional clutch plate mechanisms. Because the tolerances are so great, the brake and clutch pads (51) may be constructed of rubbery materials having high coefficients of friction, since greater resiliency is easily tolerated. Use of such pad materials allows the surface area of the pads to be commensurately reduced. Unlike conventional annular clutch pads the present invention may utilize a plurality of pads, preferably two in number, spaced radially from the shaft axis and preferably equiangularly about such axis. Preferably, both the clutch-brake pad (51) and the spring stop pad (52) are manufactured from a rubber such as nitrile rubber. As noted above, although separate brake and clutch pads may be used, these may easily be combined into a single clutch-brake pad (51) as shown in the drawings. It may be necessary, however, to vary independently this surface areas of the respective areas of the pad to achieve both optimum clutching and optimum braking.

A second advantage inheres from the availability of large design tolerances in that the substantial vertical movement of the brake plate reduces the momentary period when both clutching and braking occurs.

The generally U-shaped springs (50), as noted above, have both axial (vertical) and torsional resiliency. These two factors can largely be independently adjusted; the axial resiliency can be adjusted by changing the horizontal length of the spring legs and the thickness of the metal utilized. The torsional resiliency can be adjusted by changing the width and thickness of the spring, and also its other dimensions. Note that deflection of the spring in one mode (torsion or compression) does not significantly affect the spring constant of the spring in the other mode.

Means are provided to actuate the clutch-brake mechanism. Although this may be accomplished in a number of ways that will now be evident, preferably one or more actuator spring(s) (44) (FIG. 1) are utilized which normally urge the actuator hub (40) in the clockwise direction, thereby disengaging the clutch pad from the clutch plate. Engagement of the clutch plate and pad is then accomplished by mechanical linkage, e.g., to the lawnmower handle, to overcome the actuator spring(s) (44). The actuator spring(s) (44) may be of a variety of configurations and may be variously positioned to urge the brake plate into engagement with the brake pads. FIG. 1 depicts a helical spring (44) attached between the actuator hub (40) and the ramp-mounting hub (62). The length and size of the springs may be selected according to the number of springs and the cumulative force required. Alternately, a compression spring or springs could be installed between these two members. Springs may also be installed between the actuator arm (45) and the ramp-mounting hub (62) or the housing deck (21).

It is desirable to include a flywheel of the type shown in FIG. 1 in the clutch-brake assembly. The flywheel performs the typical function of a motor flywheel. The flywheel of FIG. 1 also serves as a clutch plate for the clutch-brake mechanism.

As noted above, flywheels typically are either very heavy or are quite expensive to manufacture. An ideal configuration for a flywheel would concentrate as much of the flywheel's mass as possible at the outer periphery. Attempts at manufacturing such flywheels, however, commonly have involved expensive techniques such as removing much of the inner mass of a solid metal disc on a lathe. The flywheel depicted in FIG. 1, however, provides a desirable weight configuration and yet can be manufactured by economical techniques. The flywheel has a central portion having means for engaging a shaft, and an annular shell defining an annular cavity for receiving a flywheel weight. The annular shell is connected to the central portion by any of a variety of lightweight means, and a flywheel weight is positioned coaxially within the annular cavity.

Figure 18:
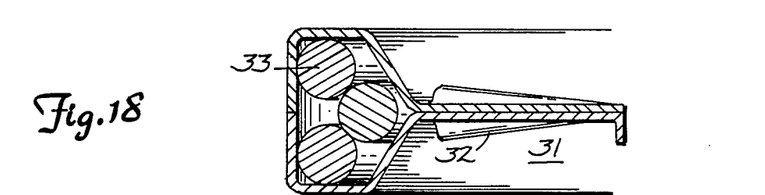
FIG. 18 is a partial cross-sectional view of a flywheel carrying a modified flywheel weight.

In a preferred method of manufacture, the flywheel is constructed of two halves, each made of sheet metal or other appropriate material formed into approximately mirror images and then joined. The connecting portion of the flywheel is relatively thin, and is therefore of comparatively low mass. A flywheel weight (33) is inserted into the outer annular cavity of the flywheel prior to mating of the two halves. A typical flywheel weight (33) is depicted in FIG. 3. This weight consists of a circular ring of heavy material such as metal. The ring may be two semi-circular rings as shown in FIG. 3, a single circular ring formed from a length of heavy material the ends of which abut, or a continuous ring made by slicing a segment from a heavy pipe. Alternately, metal toroids can be placed in this annular cavity, as depicted in FIG. 18, or any other suitable weight.

Figures 6, 7:
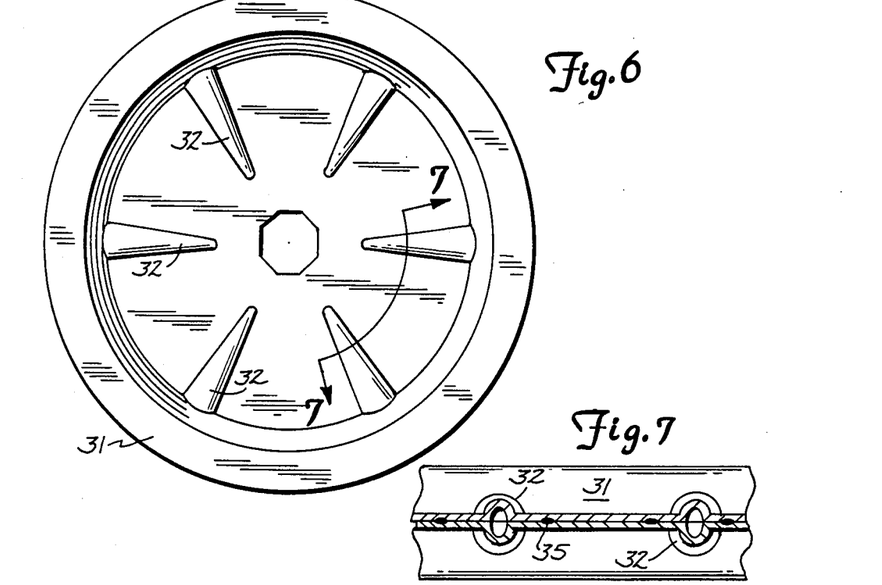
FIG. 6 is a top view of a flywheel of the invention.
FIG. 7 is a broken-away cross-sectional view of the flywheel of FIG. 6 taken along lines 7—7 thereof.

Because the connecting portion of this flywheel is relatively lightweight, it is desirable to form radial ribs to reinforce this portion of the flywheel so that it does not flutter during rotation. FIG. 6 depicts one such flywheel having six radial ribs. FIG. 7 more clearly illustrates the configuration of the ribs. FIG. 7 also shows the two halves of the flywheel joined by spot welds (35). Other conventional methods of joining the two halves can also be employed.

Figures 8, 9:
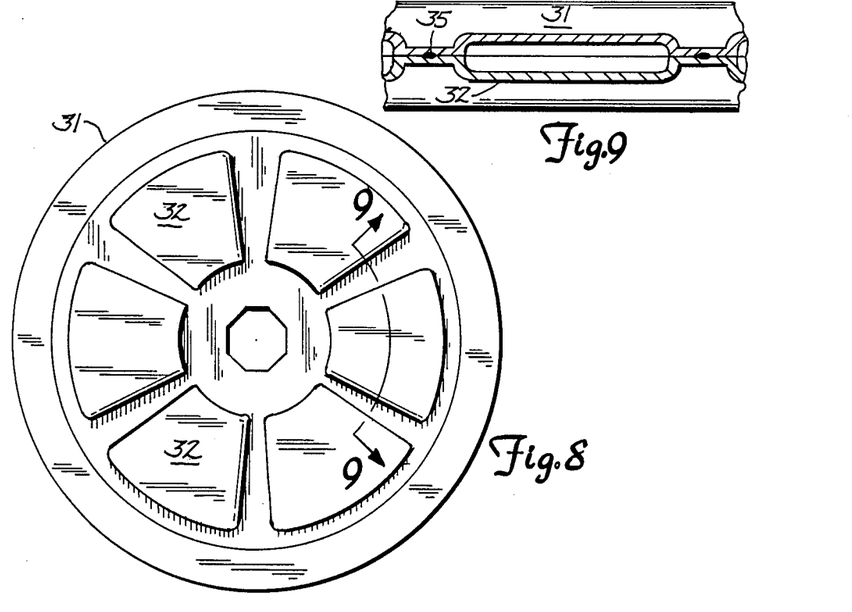
FIG. 8 is an alternative embodiment of a flywheel.
FIG. 9 is a broken-away cross-sectional view of the flywheel of FIG. 8 taken along line 9—9 thereof.
Figure 19:
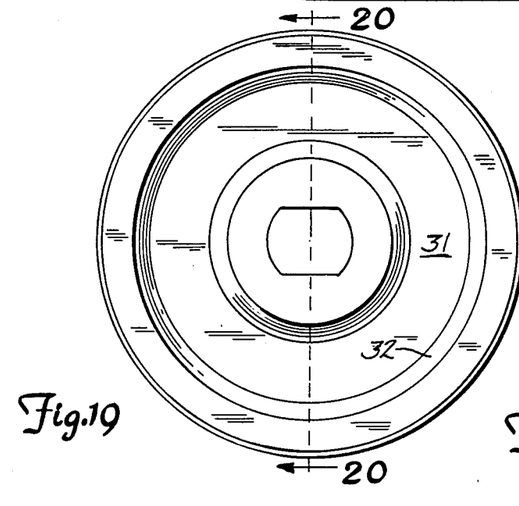
FIG. 19 is a bottom view of a modified flywheel including an alternate shape of the center hole.
Figure 20:
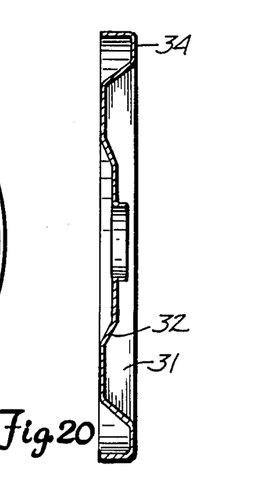
FIG. 20 is a cross-sectional view of the flywheel bottom of FIG. 19 taken along line 20—20 thereof.

FIG. 8 depicts an alternate embodiment of a flywheel with radial ribs, the configuration of which is more clearly depicted in FIG. 9. A variety of rib configurations may be utilized to provide the necessary stability for the connecting portion of the flywheel. In one embodiment, the material between the ribs is removed to reduce weight, leaving radial rib-like spokes. Indeed, the ribs need not be radial but could be concentric. FIG. 19 depicts one such flywheel, the cross-sectional configuration of the bottom half of which is shown in FIG. 20. The radial ribs provide an additional advantage in that they enhance the airflow around the clutch-brake assembly, keeping it free from grass and other debris without having to seal the unit.

Figure 17:
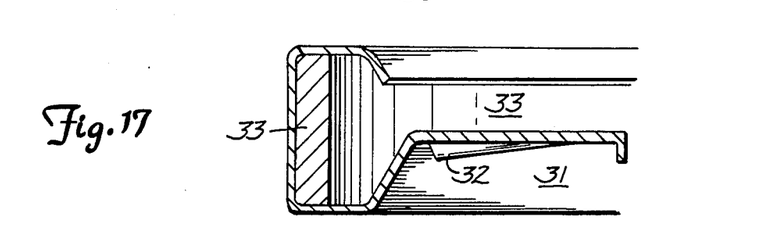
FIG. 17 is a broken-away cross-sectional view of a flywheel formed from a single piece of sheet metal.

It should be noted that the flywheel (31) need not be constructed of two opposing mating sections of material but rather may be constructed of a single sheet as depicted in FIG. 17. Although the instant invention is intended to embrace such configurations, from a manufacturing standpoint they are less desirable because the flywheel (31) must be formed with the flywheel weight (33) already in place.

Although most of the drawings depict the connecting means as being manufactured from sheet metal or similar material, the central shaft engaging means could be connected to the annular shell by spokes, or any other lightweight member.

As can be seen by comparing FIGS. 6 and 19, the flywheel (31) may be rotationally secured to the shaft (20) by constructing the clutch plate hub (30) and the hub-engaging aperture of the flywheel of a noncircular cross-section. FIG. 6 depicts a flywheel having an octagonal hole. FIG. 19 depicts a flywheel with a generally circular center hole but having two flat sides.

Figure 16:
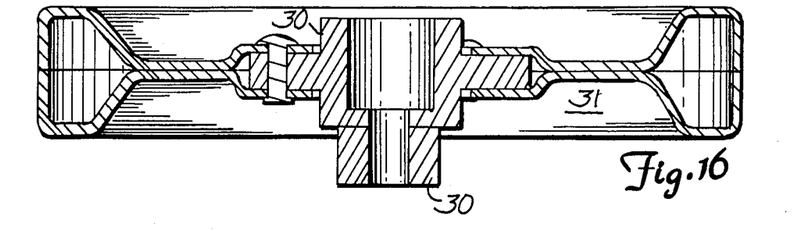
FIG. 16 is a cross-sectional view of a modified embodiment of a flywheel mounted on a clutch plate hub, the flywheel weight being omitted for clarity.

An alternate shaft engaging means is depicted in FIG. 16. In this embodiment, the clutch plate hub (30) is constructed with a continuous or segmented ring extending radially outwardly. The two halves of the flywheel are formed to receive this ring and bolts, rivets or spot welds secure the three pieces together. In this embodiment, additional radial ribs are not necessary to stabilize the connecting portion of the flywheel.

FIG. 2 depicts a particularly preferred embodiment of the clutch-brake assembly. The most notable aspect of this embodiment is that merely by detaching the bolt (25) the entire unit can be removed from a lawnmower. Thus, this sub-assembly can be preassembled and installed on a lawnmower easily, reducing assembly costs. This feature of the clutch-brake assembly is accomplished by attaching the ramp-mounting hub (62) to the clutch plate hub (30) by means of a ballbearing race (55). The ramp-mounting hub (62) is rotationally immobilized by a wire form (26) which is attached to the housing (21) and inserted into an aperture in the top of the ramp-mounting hub (62).

The fact that this sub-assembly is a self-contained unit provides an additional advantage, reducing wear on the engine. During braking, conventional brake mechanisms commonly exert a large downward force on a brake pad carried by the blade. This force, commonly 80-100 lbs., acts to try to pull the drive shaft downwardly out of the engine. Because lawnmower engines typically can withstand a continuous load of only about 50 lbs., the brief intervals of 80-100 lb. forces tend to cause undue wear on the engine. The sub-assembly of FIG. 2 solves this problem: the entire downward force exerted on the clutch-brake pads (51) is taken up in the clutch plate hub (30)—i.e., the force is both generated and absorbed within the sub-assembly, caused no net force on the drive shaft (20) (except, of course, the weight of the sub-assembly itself).

In connection with this feature, it should be noted that the leaf springs (50) in the conventional assembly of FIG. 1 also help alleviate the problem: due to the cantilever design of the springs (50), although the total force between the clutch-brake pad (51) and the clutch plate (34) may be 60–80 lbs., only about 40 lbs. of force by the brake plate (41) against the clutch-brake pad (51) is necessary.

FIG. 2 depicts various features worthy of further description. The clutch plate hub (30) may be rotationally secured to the shaft (20) by means of one or more keys or other means. The lower shoulder of the actuator hub (40) which provides the brake plate (41) may be curved, as shown, rather than flat. This curved shoulder tends to wear a complementary curve into the clutch-brake pad (51), enhancing the friction between the two surfaces. The preferred flex spring (50) and spring-mounting hub (53) depicted in FIG. 4 are also utilized in this embodiment. Also noteworthy is the fact that, like all the embodiments described herein, the clutch-brake assembly contains relatively few parts compared with assemblies known in the art.

While preferred embodiments of the present invention have been described, both with respect to the individual parts and with respect to the application of the invention to a lawnmower, it should be understood that various changes, adaptations, and modifications may be made without departing from the spirit of the invention and the scope of the appended claims, including the application of the clutch-brake assembly to implements other than lawnmowers.

What is claimed is:

1. A clutch-brake assembly for a power-driven implement having a stationary frame and a power-driven shaft having an axis, comprising a clutch plate attached to the shaft and rotatable therewith;

a brake plate carried coaxially of the shaft;

a driven member carried by the shaft and freely rotatable thereon;

a brake pad and a clutch pad for engagement, with the brake plate and clutch plate, respectively, and at least one leaf spring carried by the driven member and spaced radially from the shaft axis, the at least one leaf spring directly carrying the brake and clutch pads in alignment with the brake and clutch plates, respectively, and normally biasing the clutch pad into engagement with the clutch plate to drive the driven member; and motion transmitting attachment means for attaching the brake plate to the frame coaxially of the shaft to cause axial movement of the brake plate in response to rotation thereof between a first axial position out of engagement with the brake pad and a second axial position in braking contact with the brake pad and spacing the clutch pad from the clutch plate.

2. The assembly of claim 1 including a plurality of leaf springs, each of said leaf springs directly carrying a respective clutch pad and brake pad spaced radially from the shaft and in alignment with the clutch and brake plates respectively.

3. The clutch brake assembly of claim 1 further including a flywheel attached to the shaft and rotatable therewith, the flywheel having a substantial portion of its mass near its outer periphery, the clutch plate comprising a wall of the flywheel.

4. The clutch-brake assembly of claim 3 wherein the flywheel comprises
   a central shaft engaging means;
   an annular shell defining an annular cavity for receiving a flywheel weight, the shell comprising two opposed, mating sections;
   connector means for coaxially mounting the shell to the shaft-engaging means; and
   a flywheel weight positioned coaxially within the annular cavity.

5. The clutch-brake assembly of claim 1 wherein the motion transmitting attachment means comprises:
   a ring-shaped ramp having a plurality of inclined slots about its periphery;
   a ramp-mounting hub attached to the housing and mounting the ramp coaxially to the shaft;
   an actuator hub carrying the brake plate, the actuator hub including means for positioning the actuator hub coaxially of the shaft and having a plurality of tabs slideably received within the ramp slots so that when the actuator hub is rotated in the same direction as the shaft said hub is displaced axially towards the brake pad; and
   means for rotating the actuator hub to cause axial movement thereof.

6. The clutch-brake assembly of claim 5 wherein the positioning means includes a flange in slideable contact with the ramp, the ramp defining a bushing rotatably mounting the actuator hub coaxial of the shaft.

7. The clutch-brake assembly of claim 5 wherein the means for rotating the actuator hub comprises spring means functionally attached between the actuator hub and the ramp-mounting hub, the spring means urging the actuator hub in the direction of rotation of the shaft.

8. The clutch-brake assembly of claim 7 further comprising manually operable means for rotating the actuator hub counter to the direction of rotation of the shaft to move the brake plate axially away from the brake pad.

9. The assembly of claim 1 wherein said at least one leaf spring provides substantial structural support for the brake and clutch pads.

10. A clutch-brake assembly for a power-driven implement having a stationary frame and a power-driven shaft having an axis, comprising:
    a clutch plate attached to the shaft and rotatable therewith;
    a brake plate carried coaxially of the shaft;
    a driven member carried by the shaft and freely rotatable thereon;
    a brake pad and clutch pad for engagement with the brake plate and clutch plate, respectively, and spring means carried by the driven member and spaced radially from the shaft axis, the spring means carrying the brake and cluth pads in alignment with the brake and clutch plates, respectively, and normally biasing the clutch pad into engagement with the clutch plate to drive the driven member, the spring means generally comprising a resiliently compressible U-shaped leaf spring having one arm thereof carried by the driven member, and a second free arm thereof mounting the brake pad and the clutch pad; and
    motion transmitting attachment means for attaching the brake plate to the frame coaxially of the shaft to cause axial movement of the brake plate in response to rotation thereof between a first axial position out of engagement with the brake pad and a second axial position in braking contact with the brake pad and spacing the clutch pad from the clutch plate.

11. The clutch-brake assembly of claim 10 wherein the free arm extends radially outwardly, and the brake plate contacts the brake pad radially outwardly from where the clutch plate contacts the clutch pad.

12. The clutch-brake assembly of claim 10 including stop pad means mounted between the free spring arm and the driven member for directly transmitting rotational motion therebetween upon compression of the spring.

13. The clutch-brake assembly of claim 10 wherein the leaf spring is so constructed and arranged as to enable its free end, and the clutch and brake pads carried thereby, to deflect from the horizontal when under torsional stress whereby the surface area of the pads in contact with the respective plate surfaces is decreased, promoting slippage therebetween.

14. A clutch-brake assembly for a power-driven implement having a stationary frame and a power-driven shaft having an axis comprising:
    a clutch plate attached to the shaft and rotatable therewith;
    a brake plate carried coaxially of the shaft; a driven member carried by the shaft and freely rotatable thereon;
    a brake pad and a clutch pad for engagement with the brake plate and clutch plate, respectively, and spring means carried by the driven member and spaced radially from the shaft axis, the spring means carrying the brake and clutch pads in alignment with the brake and clutch plates, respectively, and normally biasing the clutch pad into engagement with the clutch plate to drive the driven member;
    a ring-shaped ramp mounted to the shaft and freely rotatable thereon, the ramp having a plurality of inclined slots about its periphery;
    means for preventing rotation of the ramp with respect to the frame;
    an actuator hub carrying the brake plate and including a flange in slideable contact with the ramp, the ramp thus defining a bushing for rotatably mounting the actuator hub coaxial of the shaft, the actuator hub further including a plurality of tabs slideably received within the ramp slots so that when the actuator hub is rotated in the same direction as the shaft said hub is displaced axially towards the brake pad; and
    means for selectively rotating the actuator hub to cause axial movement thereof;
    whereby during braking the vertical force applied to the brake pad by the brake plate is both generated and absorbed within the assembly mounted to the shaft so that no net vertical force component is applied to the shaft.

15. A clutch-brake assembly for a power-driven implement having a stationary frame and a power-driven shaft having an axis, comprising
    a clutch plate attached to the shaft and rotatable therewith;
    a brake plate carried coaxially of the shaft;

a driven member carried by the shaft and freely rotatable thereon;

a brake pad and a clutch pad for engagement with the brake plate and clutch plate, respectively, and at least one leaf spring directly carried by the driven member and spaced radially from the shaft axis, the at least one leaf spring directly carrying the brake and clutch pads in alignment with the brake and clutch plates, respectively, providing structural support to the brake and clutch pads both rotationally and radially, and normally biasing the clutch pad into engagement with the clutch plate to drive the driven member; and motion transmitting attachment means for attaching the brake plate to the frame coaxially of the shaft to cause axial movement, toward the brake pad, of the brake plate in response to rotation from a first axial position out of engagement with the brake pad to a second axial position in gentle braking contact with the brake pad whereupon such braking contact causes further accelerated rotation of the brake plate inducing rapid axial movement thereof to a third axial position in aggressive braking contact with the brake pad.

16. A clutch-brake assembly for a power-driven implement having a stationary frame and a power-driven shaft having an axis, comprising:

a flywheel attached to the shaft and rotatable therewith, and having a lower surface defining a clutch plate; the flywheel having a central shaft-engaging means, an annular shell defining an annular cavity for receiving a flywheel weight, connector means for coaxially mounting the annular shell to the shaft-engaging means, and a flywheel weight positioned coaxially within the annular cavity so that a substantial portion of the flywheel mass is located near its outer periphery;

a brake plate carried coaxially of the shaft;

a driven member carried by the shaft and freely rotatable thereon;

a brake pad and a clutch pad for engagement with the brake plate and clutch plate, respectively, and spring means carried by the driven member and spaced radially from the shaft axis, the spring means carrying the brake and clutch pad in alignment with the brake and clutch plates, respectively, and being both axially and circumferentially resilient, the spring means normally biasing the clutch pad into engagement with the clutch plate to drive the driven member;

a ring-shaped ramp having a plurality of inclined slots about its periphery;

a ramp-mounting hub attached to the frame and mounting the ramp coaxially to the shaft;

an actuator hub carrying the brake plate and having a plurality of tabs formed to be slideably received within the ramp slots so that when the actuator hub is rotated in the same direction as the shaft said hub is displaced axially towards the brake pad;

spring means operatively attached between the frame and the actuator hub for urging the actuator hub in the direction of rotation of the shaft to cause axial movement of the brake plate in response to rotation thereof from a first axial position out of engagement with the brake pad to a second axial position in braking contact with the brake pad and spacing the clutch pad from the clutch plate, and means for overcoming said spring means to rotate the actuator hub counter to the rotation of the shaft, so that the brake plate is moved axially away from the brake pad.

17. A clutch brake assembly for a power-driven implement having a stationary frame and a power-driven shaft, having an axis comprising a clutch plate hub removeably attached to the shaft and rotatable therewith;

a flywheel attached to the clutch plate hub and rotatable therewith, and having a lower surface defining a clutch plate;

a brake plate carried by the clutch plate hub coaxially of the shaft;

a driven member carried by the clutch plate hub and freely rotatable thereon;

a brake pad and a clutch pad for engagement with the brake plate and clutch plate, respectively, and spring means carried by the driven member and spaced radially from the shaft axis, the spring means carrying the brake and clutch pads in alignment with the brake and clutch plates, respectively, and normally biasing the clutch pad into engagement with the clutch plate to drive the driven member;

motion transmitting attachment means for rotatably attaching the brake plate to the clutch plate hub coaxially of the shaft to cause axial movement of the brake plate in response to rotation thereof between a first axial position out of engagement with the brake pad and a second axial position in braking contact with the brake pad and spacing the clutch pad from the clutch plate; and means for rotating the brake plate with respect to the frame;

whereby during braking the vertical force applied to the brake pad by the brake plate is both generated and absorbed within the assembly mounted to the shaft so that no net vertical force component is applied to the shaft.

18. A clutch-brake assembly for a power-driven implement having a stationary frame and a power-driven shaft having an axis; comprising a clutch plate attached to the shaft and rotatable therewith;

a brake plate carried coaxially of the shaft;

a driven member carried by the shaft and freely rotatable thereon;

a brake pad and a clutch pad for engagement with the brake plate and clutch plate, respectively, and leaf spring means carried by the driven member and spaced radially from the shaft axis the leaf spring means comprising a leaf spring carried by the driven member, said leaf spring carrying the brake and clutch pads in alignment with the brake and clutch pads, respectively, and normally biasing the clutch pad into engagement with the clutch plate to drive the driven member, the brake pad being located closer to a free end of said leaf spring than the clutch pad; and motion transmitting attachment means for attaching the brake plate to the frame coaxially of the shaft to cause axial movement of the brake plate in response to rotation thereof between a first axial portion out of engagement with the brake pad and a second axial position in braking contact with the brake pad and spacing the clutch pad from the clutch plate.

19. A clutch-brake assembly for a power-driven implement having a stationary frame and a power-driven shaft having an axis, comprising:
   a clutch plate attached to the shaft and rotatable therewith;
   a brake plate carried coaxially of the shaft;
   a driven member carried by the shaft and freely rotatable thereon;
   a brake pad and a clutch pad, comprising two areas of a single clutch-brake pad, for engagement with the brake plate and clutch plate, respectively, and leaf spring means carried by the driven member and spaced radially from the shaft axis, the leaf spring means carrying the brake and clutch pads in alignment with the brake and clutch plates, respectively, and normally biasing the clutch pad into engagement with the clutch plate to drive the driven member; and
   motion transmitting attachment means for attaching the brake plate to the frame coaxially of the shaft to cause axial movement of the brake plate in response to rotation thereof between a first axial position out of engagement with the brake pad and a second axial position in braking contact with the brake pad and spacing the clutch pad from the clutch plate.

* * * * *

UNITED STATES PATENT AND TRADEMARK OFFICE
CERTIFICATE OF CORRECTION

PATENT NO. : 4,730,710
DATED : March 15, 1988
INVENTOR(S) : Robert J. Granitz

It is certified that error appears in the above—identified patent and that said Letters Patent is hereby corrected as shown below:

Column 11, line 60 (Claim 10, line 13), replace "cluth" with --clutch-- .

Column 14, line 65 (Claim 18, line 24), replace "portion" with --position-- .

Signed and Sealed this

Ninth Day of August, 1988

Attest:

DONALD J. QUIGG

*Attesting Officer*        *Commissioner of Patents and Trademarks*